United States Patent [19]

Buryakov et al.

[11] 4,279,405

[45] Jul. 21, 1981

[54] DEVICE FOR MAKING EMERGENCY EXITS IN A CRUSHED TRANSPORT MEANS

[76] Inventors: Valery M. Buryakov, ulitsa Onezhskaya, 15b, kv. 27; Nikolai N. Kolotilov, ulitsa Zorge, 36, kv. 108; Roman D. Tokhunts, Izmailovsky bulvar, 67, korpus 1, kv. 5; Vladimir S. Yakovlev, ulitsa Marshala Novikova, 6, korpus 2, kv. 56, all of Moscow; Vladislav A. Akulov, 26, kvartal 15, 15, kv. 68, Kuibyshev; Viktor G. Zabotin, ulitsa 22 Siezda, 179, kv. 27, Kuibyshev; Viktor Y. Levin, Volzhsky prospect, 33, kv. 58, Kuibyshev; Viktor P. Lukachev, Volzhsky prospect, 37, kv. 10, Kuibyshev; Alexandr N. Pervyshin, 26, kvartal 15, 6, kv. 82, Kuibyshev; Konstantin A. Zaitsev, prospekt Lenina, 1, kv. 174, Kuibyshev; Vladimir D. Karakov, ulitsa Krasnodonskaya, 13, kv. 28, Kuibyshev; Mubaraksha D. Khasanov, Volzhsky prospect, 45, kv. 20, Kuibyshev, all of U.S.S.R.

[21] Appl. No.: 97,429

[22] Filed: Nov. 26, 1979

[51] Int. Cl.³ .............................................. B23K 7/04
[52] U.S. Cl. ...................................... 266/55; 266/54; 266/71; 266/77; 244/137 P
[58] Field of Search ....................... 266/48, 58, 70, 71, 266/76, 77, 54, 55; 244/118.5, 137 P, 122 AF, DIG. 2; 114/50

[56] References Cited

U.S. PATENT DOCUMENTS

| 3,454,245 | 7/1969 | Burkdoll et al. ................. 244/137 |
| 3,729,154 | 4/1973 | Deplante ..................... 244/122 AF |
| 3,806,069 | 4/1974 | Galton ........................ 244/122 AF |
| 3,822,660 | 7/1974 | Throner .............................. 114/50 |

FOREIGN PATENT DOCUMENTS

| 2612574 | 10/1976 | Fed. Rep. of Germany .... 244/122 AF |
| 220060 | 6/1968 | U.S.S.R. . |

OTHER PUBLICATIONS

Express Information "Air Transport", No. 16, 1976, pp. 28–30, All Union Institute of Scientific and Engineering Information, Moscow.
Foreign Air Transport, "Explosion Makes Emergency Exits", No. 4, 1970, p. 13.

Primary Examiner—L. Dewayne Rutledge
Assistant Examiner—John P. Sheehan
Attorney, Agent, or Firm—Holman & Stern

[57] ABSTRACT

A device comprises a gas cutter in the form of an annular combustion chamber (10) provided with injectors and manifolds for delivery of oxidant and fuel into the combustion chamber (10) and an annular nozzle (9) adapted to cut an escape hatch out of the intact area of an aircraft hull. Mounted centrally in the combustion chamber is a punching-and-gripping means (8) fired into the wall to be cut for securing a gas cutter (6) thereto. This gas cutter together with oxidant and fuel bottles may be conveniently mounted between external and internal skins of an aircraft to serve as means for performing an independent autonomous rescue operation with the result that in the course of several seconds escape hatches may be cut in an aircraft hull with the maximum safety and dependability, without waiting for arrival of rescue parties at a crash scene.

6 Claims, 6 Drawing Figures

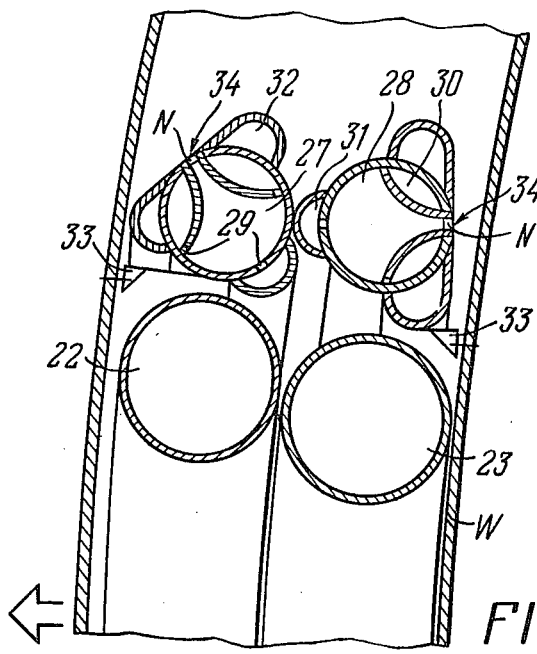
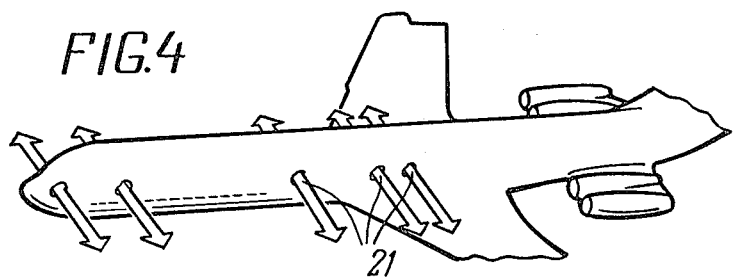
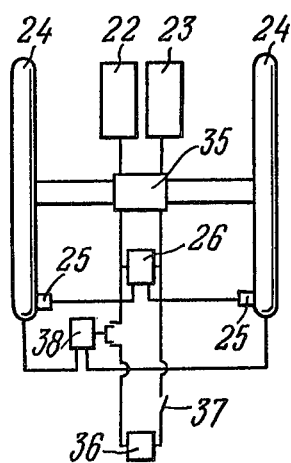

DEVICE FOR MAKING EMERGENCY EXITS IN A CRUSHED TRANSPORT MEANS

BRIEF SUMMARY OF THE INVENTION

The present invention relates to aircraft engineering and more particularly to devices for making escape hatches in the hull of an aircraft during rescue operations.

Known in the art are devices for making escape hatches in the hull of an aircraft (cf. Dzikas N.M. et al., Fire-Fighting Technique, reference catalogue, TSNII-TEstroimash, Moscow, 1974, pp. 515–522, in Russian).

However, in practice the time required for cutting an escape hatch with the help of such devices amounts to a value of from 3 to 9 minutes which generally fails to ensure safe evacuation of passengers.

Also known in the art is the description of a device comprising a trolley and a punching means in which the disadvantage heretofore mentioned is eliminated by that the punching means is made in the form of a carriage accelerated on guides by means of a firing mechanism (cf. USSR Inventor's Certificate No. 220,060, cl. 62c 27/02, MIIK B64).

However, the use of such a device for punching an escape hatch does not generally guarantee complete safety of passengers and crew members, as the strength of blow in this case amounts to a substantial value (of the order of several tens of tons) which may cause overturning of an aircraft, explosion of fuel vapours in the tanks, injuries to passengers and crew members as well as elimination of traces required for investigating the causes of an aircraft accident.

Among the devices for making emergency exits in an aircraft for rescue of passengers, there is also known an aircraft system for punching emergency exits by means of explosive cord charges (cf. Express Information "Air Transport" No. 16, 1976, Moscow, pp. 28–30, in Russian). However, the airline companies of the world consider such explosive devices as being unsafe in practice, due to which the development thereof remains over a number of years in the experimental stage and finds no practical use (cf."Foreign Air Transport" No. 4, 1970, p.13, in Russian).

It is an object of the present invention to provide a device for making emergency exits in a crashed transport which will allow a rescue operation to be performed in shortest period of time and with a maximum safety for passengers and crew members.

It is another object of the present invention to provide such a device for making emergency exits in a crashed transport means which will allow repeated usage thereof and ensure good condition of a transport means upon completion of rescue operations.

It is still another object of the present invention to provide such a device for making emergency exits in a crashed transport means which will be successfully used aboard, for example, an aircraft for cutting emergency exits by crew members or passengers without participation of external rescue parties, for example, in case of a forced landing in a difficult and distant locality.

It is yet another object of the present invention to provide a device for making emergency exits in a crashed transport means which will have comparatively small overall dimensions and weight, and be inexpensive in manufacture and operation.

To accomplish the above-mentioned and other objects of the present invention, a device is provided for making emergency exits in a crashed transport means, comprising a unit for an emergency breaking of the intact wall of a transport means hull simultaneously along a given contour to form an escape hatch and an arrangement for actuating said unit when in contact with the wall of a transport means.

This device is characterized in that said unit is a gas cutter in the form of a combustion chamber provided with an outlet nozzle adapted to cut an escape hatch having the desired contour, or peripheral shape and an arrangement for delivering to and igniting a combustible mixture in said combustion chamber on the signal received through the medium of an emergency switch.

Such an embodiment of the invention being of comparatively small overall dimensions and weight, makes it possible to ensure safety and adequate speed in making an emergency exit in a crashed transport means.

According to one of the embodiments of the present invention a device is provided for making emergency exits, characterized in that said gas cutter is made in the form of an annular combustion chamber provided with injectors for delivery of oxidant and fuel thereinto, an ingnition plug and an outlet annular nozzle adapted to cut simultaneously the entire contour, or peripheral shape, of an escape hatch.

Such an embodiment of the invention makes it possible to substantially reduce the time required for making an emergency exit, as the latter is cut simultaneously along the entire contour.

According to another embodiment of the present invention a device is provided for making emergency exits, characterized in that mounted on said annular combustion chamber centrally along the axis thereof is a punching-and-gripping means provided in its head portion with an arrangement for fixing the gas cutter on a wall of a transport means hull.

Such an embodiment of the invention make it possible to rapidly fix the gas cutter in the skin of an aircraft at a place intended for making an emergency exit.

According to still another embodiment of the invention a device is provided for making emergency exits, characterized in that the combustion chamber is of a reverse-flow type, the nozzle is provided with cooling cavities and the punching-and-gripping means has in its head portion a passage for delivery of a fire extinguishing agent inside the aircraft.

Such an embodiment of the invention allows the gas cutter to be made suitable for repeated usage and ensures safety of passengers in the process of making an emergency exit.

According to the present invention a still another device is provided for making emergency exits, characterized in that two annular combustion chambers are arranged between the internal and external skins of an aircraft hull and provided with nozzles one of which is directed towards the internal skin and the other, towards the external skin, the nozzles being provided with diaphragms and the combustion chamber being filled wth an inert gas.

Such an embodiment of the invention allows an emergency exit to be made directly by crew members or passengers without waiting for arrival of rescue parties. Besides, this preferred embodiment of the invention ensures safety of an aircraft in flight under usual operating conditions.

A device for making emergency exits may be characterized in that bottles with oxidant and fuel are arranged between the skins of an aircraft hull and connected to the combustion chambers, the nozzles thereof being oriented at different angles to the skin panels so that the cut portions of the skin are extracted outwardly from a transport means under the action of resultant reactive thrust developed by the gas cutter.

Such an embodiment of the invention makes it possible to ensure extraction of the cut portion of a transport means outwardly therefrom without additional arrangements.

BRIEF DESCRIPTION OF THE SEVERAL VIEWS OF THE DRAWINGS

To enable the invention to be understood more clearly, the preferred embodinents thereof will be more fully described hereafter with reference to the accompaying drawings, wherein:

FIG. 4 illustrates a in perspective layout of one embodiment of the invention as used on an aircraft;

FIG. 5 illustrates a in cross-section part of the device of FIG. 4 at the place of its installation on an aircraft;

FIG. 6 is a block diagram of control elements of the device of FIG. 5 in an airborne embodiment.

DETAILED DESCRIPTION

Figure 1:
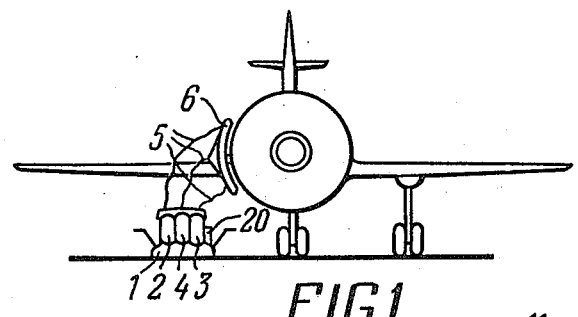
FIG. 1 is a general elevation view of a device according to the invention.
Figure 3:
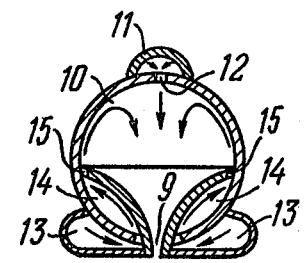
FIG. 3 is a radial section of a gas generator combustion chamber in a device of FIG. 2.

The device of this invention incorporates a container 1 (FIG. 1), comprising a bottle 2 of hydrogen, bottle 3 of oxygen and a bottle 4 containing a fire extinguishing agent, reinforced hoses 5, a gas cutter 6, a gas generator with ignition plugs 7 (FIGS. 2,3) and a punching-and-gripping means 8.

The gas cutter 6 has a general configuration conforming to the geometry of a hatch and has the form of a torus with an annular slot forming and outlet nozzle 9 for a critical throat section of its toroidal (annular) combustion chamber 10 of a reverse-flow type which is provided with manifold 11 and oxidant injectors 12 disposed along the longitudinal axis of the radial section in a diametrically opposite relation to the critical throat section, fuel injectors 13, cavities 14 for cooling the zone of the critical throat section and slit injectors 15 suitably formed by walls of the combustion chamber 10 and the cooling cavities 14.

The punching-and-gripping means 8 is secured on the gas cutter 6 and has in its striking portion a passage 16 for delivery of a fire extinguishing agent into the internal surface of a wall 17 of an aircraft cabin. Mounted on the punching-and-gripping means 8 is a detachable explosive cartridge 18 with an initiating mechanism thereof and adjustable rods 19. The ignition plugs 7 and the initiating mechanism of the explosive cartridge 18 are supplied with electric power from a storage battery 20 (FIG. 1) installed on the container 1.

The device operates in the following manner.

Figure 2:
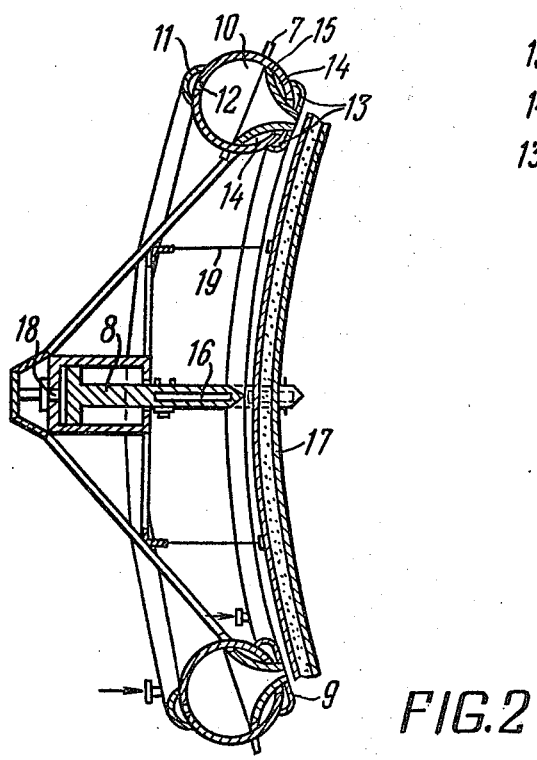
FIG. 2 is a longitudinal section of a gas generator with a punching-and-gripping means in a device of FIG. 1.

The gas cutter 6 is brought to a crashed aircraft for a distance registered by the adjustable rods 19 (FIG. 2). From the storage battery 20 the electric power is supplied to the initiating mechanism of the explosive cartridge 18 due to which the punching-and-gripping means 8 is brought into action, and punches both the skins and becomes grippingly fixed in the aircraft. At the same time the fire extinguishing agent is delivered from the bottle 4 of the container 1 through one of the hoses 5 to the passage 16 of the punching-and-gripping means 8 and sprayed along the internal surface of the aircraft cabin, thereby isolating the passengers from the action of a gas jet.

Along with this the electric power is supplied to the ingition plugs 7 and the hydrogen and oxygen are delivered from the bottles 2 and 3 of the container 1 through the separate hoses 5 to the toroidal combustion chamber 10 of the gas cutter 6 wherein they are ignited by the ignition plugs 7. In this case the hydrogen from the delivery manifolds 13 is directed first to the cooling cavities 14 and then through the slit injectors 15 is delivered into the zone of combustion. The oxygen is delivered into the combustion chamber 10 from the manifold 11 through the injectors 12. The combustin products formed in the toroidal combustion chamber 10 issue through the annular slot of the outlet nozzle 9 in the form of a high-temperature jet which cuts a hatch in the hull of an aircraft. The cut portion of the aircraft hull held by the punching-and-gripping means 8 is extracted outwardly due to the reactive thrust of the gas cutter 6.

The use of the proposed device makes it possible to increase the effectiveness and operational efficiency of rescue operations in case of aircraft accidents, as the cutting of escape hatches in an aircraft both in the airport and out of its zone in a difficult or distant locality is performed in a substantially short time (of the order of several seconds).

The device is transportable, simple in operation, can be repeatedly used, ensures safety of passengers in the process of a rescue operation, and adds to preserving an aircraft in good condition.

Still another embodiment of a rescure device will now be considered hereafter. This device for making a plurality of emergency exits 21 (FIG. 4) in an aircraft also comprises bottles 22 and 23 with fuel and oxidant, gas generators 24 with ignition plugs 25, ignition units 26 and two toroidal combustion chambers 27 and 28 having the critical throat sections (nozzles N) suited to the geometry of an exit, injectors 29, cooling cavities 30, and manifolds 31 and 32 for delivery of oxidant and fuel.

The gas generators 24 with the bottles 22 and 23 containing fuel and oxidant respectively are disposed between the internal and external walls of the aircraft skin W and secured thereon by means of shock absorbers 33, and each gas generator 24 is provided with two combustion chambers 27 and 28, the critical throat sections (nozzles N) thereof being closed by hermetic diaphragms 34.

The axis of symmetry of the radial section of the combustion chamber 28 directed by the critical throat section (nozzle N) towards the internal wall W of the skin is oriented along the axis of the gas generator 24, while the axis of the chamber 27 directed towards the external wall is oriented at an angle to ensure the extraction of the cut portion of an aircraft hull outwardly under the action of an excess reactive thrust.

Said angle is selected so that, firstly, the gas jet issuing from the critical throat section of the combustion chamber 27 is in contact with the skin wall W along a contour the dimensions of which are greater than the dimensions of the gas generator 24 and, secondly, the resultant thrust derived from the adding or combining, of the reactive thrusts of the combustion chambers 27 and 28 is directed outwardly from the aircraft.

The gas generators 24 are actuated by remotely controlled valves 35, the signal for their actuation being sent, for instance, from an aircraft emergency electric power source 36 through the medium of a switch 37 mounted either in the cockpit or in the passenger cabin.

It is anticipated that the device may be provided with a means for actuating the valves 35 from the outside of an aircraft.

Before the command for actuation of the valves 35 is given, the combustion chambers 27 and 28 are filled with an inert gas and the gas generators 24 are under control of state of readiness transmitters 38.

If upon the landing of an aircraft the doors and escape hatches thereof are jammed, a crew member or a passenger should throw in the switch 37, thereby applying voltage from the aircraft emergency electric power supply source 36 through the ignition unit 26 to the ignition plugs 25 and also to the valves 35.

When the valves 35 are opened, the oxidant via the manifold 31 and the fuel via the manifolds 32 and the cooling cavities 30 are delivered through the injectors 29 into the combustion chambers 27 and 28 wherein they are ignited by the ignition plugs 25.

The combustion products break the diaphragms 34 and issue through the critical throat sections (nozzles N) onto the skin of an aircraft, thereby making the emergency exits 21 (FIG. 4).

The cut portion of an aircraft hull acted upon by an excess, or higher, reactive thrust of the nozzle N for combustion chamber 28, relative to combustion chamber 27, (FIG. 5) is extracted together with the gas cutter device outwardly from the aircraft. If any of the gas generators 24 is put out of action by deformation of the aircraft the respective state of readiness transmitter 38 cuts out the supply of electric power to the valve 35 of a damaged gas generator 24.

The proposed device allows the emergency exits 21 to be cut in an aircraft by crew members or passengers regardless of the arrival of rescue parties. Due to the fact that both walls of the skin are cut simultaneously, the time required for making emergency exits is brought to a minimum.

Thus the safety in transportation of passengers by air is increased and the loss of expensive technique is reduced.

What is claimed is:

1. A device for making emergency exits in a crushed transport means, comprising, a gas cutter in the form of a combustion chamber having an outlet nozzle adapted and directed toward the wall of said transport to cut an aperture in the wall having the desired peripheral shape of an escape hatch, means for delivering into and igniting a combustible mixture in said combustion chamber and an emergency switch operatively connected with said means for delivering and igniting a combustible mixture to activate said means, said gas cutter being positioned with respect to the wall of a transport means so that a gas jet issued from said combustion chamber when said mixture is ignited through said outlet nozzle simultaneously cuts an escape hatch over the entire periphery thereof.

2. A device for making emergency exits as claimed in claim 1, wherein said combustion chamber is made in the form of an annular shaped member and is provided with injectors for delivering oxidant and fuel to said combustion chamber to form said combustible mixture, an ingition plug is provided in said combustion chamber, and said outlet nozzle is an annular slot through the wall of said combustion chamber.

3. A device for making emergency exits as claimed in claim 2, wherein there is mounted on said annular combustion chamber centrally along the central axis of the annulus a punching-and-gripping means having a head portion and means for driving said head portion through said wall of a transport and fixing the gas cutter on said wall of a transport.

4. A device for making emergency exits as claimed in claim 3, wherein the combustion chamber is of a reverse-flow type, the nozzle is provided with cooling cavities and the punching-and-gripping means has in its head portion means passage for delivery of a fire extinguishing agent inside the aircraft.

5. A device for making emergency exits as claimed in claim 2, wherein two of said gas cutters are disposed between the external and internal skins of an aircraft hull with the nozzle of one directed towards the internal skin and the nozzle of the other is directed towards the external skin; the nozzles being provided with frangible diaphragms to seal said combustion chambers at the nozzle outlets and the combustion chambers being filled with an inert gas.

6. A device for making emergency exits as claimed in claim 5, wherein bottles containing oxidant and fuel are arranged between said skins and are connected to said combustion chambers, said nozzles being oriented at different angles to panels of the skin so that cut portions of the skin are ejected outwardly from the transport means by the resultant thrust produced by simultaneous operation of said two gas cutters.

* * * * *